Patented June 16, 1953

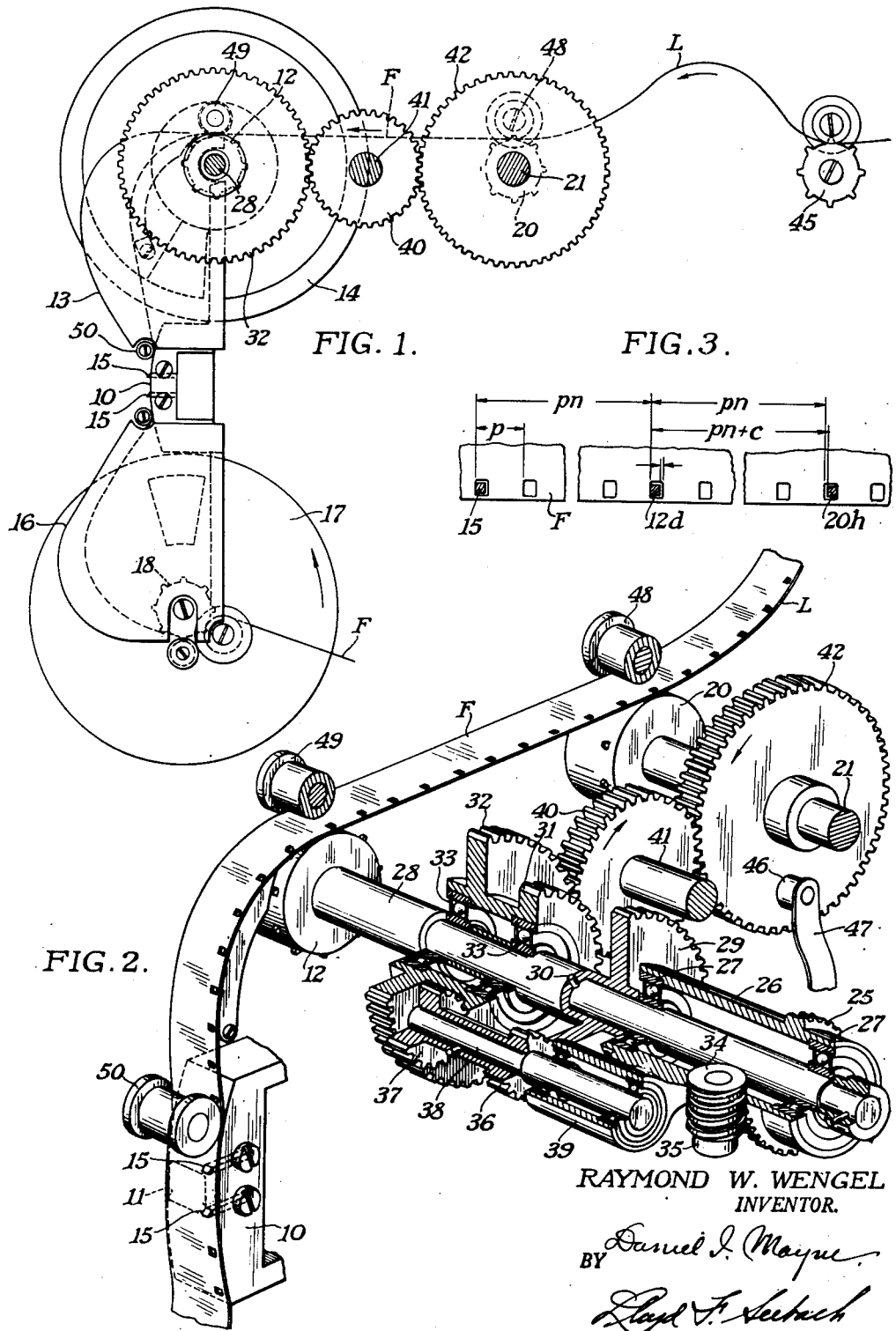

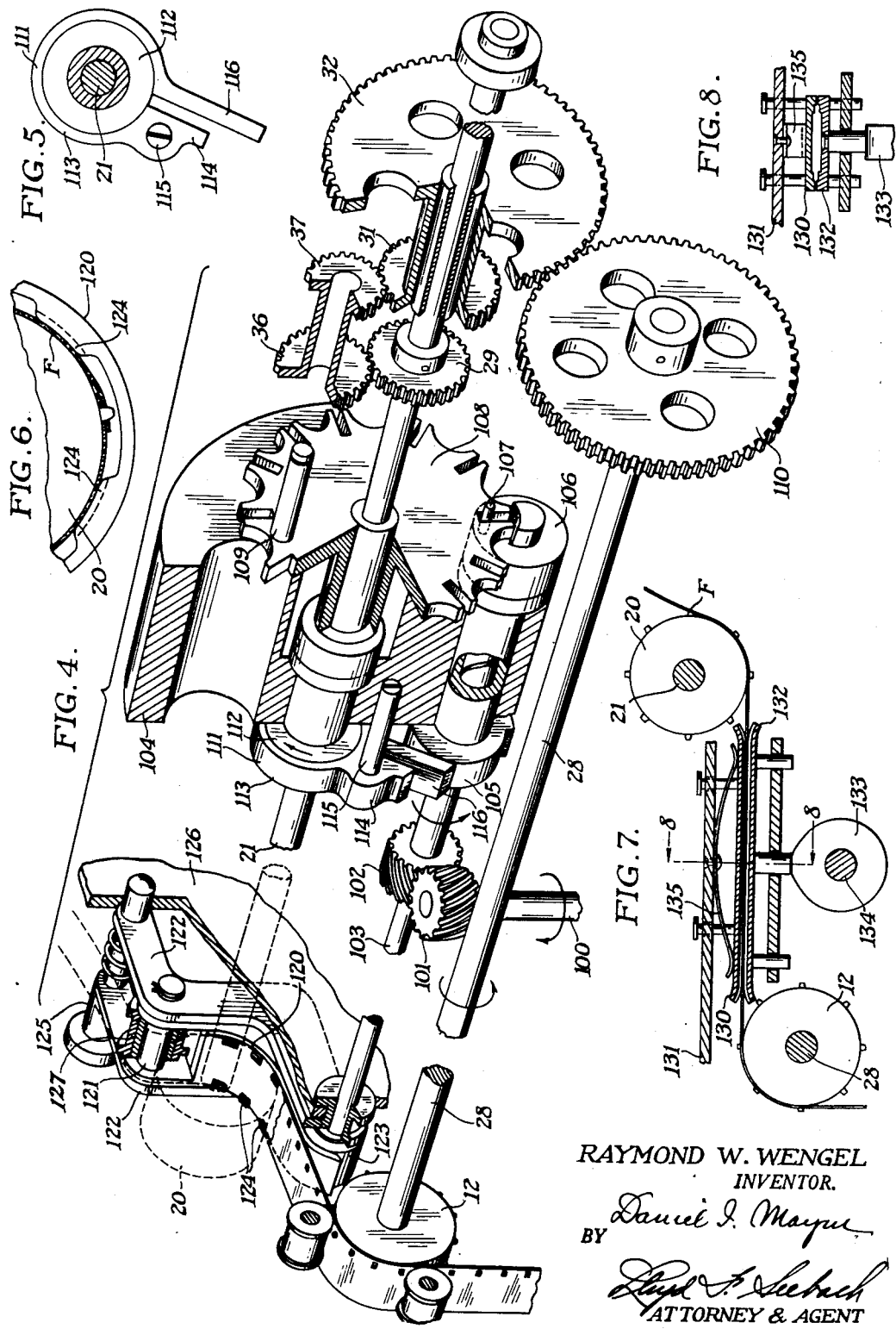

2,641,961

UNITED STATES PATENT OFFICE 2,641,961

FILM DRIVE COMPENSATORY MECHANISM

Raymond W. Wengel, Rochester, N. Y., assignor to Eastman Kodak Company, Rochester, N. Y., a corporation of New Jersey Application April 21, 1952, Serial No. 283,297

15 Claims. (Cl. 88—18)

This invention relates to photographic apparatus and more particularly to a mechanism associated with the advancing means for a film strip in which the driving and holding points of spaced driving members are compensated or varied in accordance with the length of the film strip therebetween, the difference in length of the film strip being due to either shrinkage or stretch thereof.

As is well-known in the photographic art, a film strip may shrink or stretch depending on the conditions under which the film is stored or handled. In photographic apparatus used in conjunction with television, the film used in either a camera or projector must be properly registered at the film gate and the errors of registration must be reduced to a minimum. In my copending U. S. application, Serial No. 196,152, which was filed November 17, 1950, a pull-down mechanism is disclosed in which the film is registered and advanced by means of air under pressure applied to the loops of film ahead of and beyond the film gate. Such a pull-down arrangement permits accurate registration of the film at the aperture and accomplishes pull-down of the film strip in a time interval which is equivalent to a 7–8 degree shutter sector and to the retrace interval of a television tube. It has been found, however, that any shrinkage or stretch of the film strip very seriously hampers proper registration and allowance must be made in the pull-down cycle for the time required by the usual sprocket arrangement to advance the film a distance equal to the maximum amount of shrinkage to be expected in a length equal to the loop or to retract an amount of film equivalent to the maximum amount of stretch. The time lost in this way may be as much as five times the total time available for a 7–8 degree pull-down.

The present compensatory mechanism has been developed as an essential factor in minimizing the errors of position of the film perforations relative to the locating pin arising from variations in the film strip due to shrinkage or stretch. With the usual sprocket and locating pin, the locating pin is arranged so at the end of the pull-down stroke the perforation is positioned to engage the pin without interference, this assumes, of course, that the film is of standard or normal length. With shrunk film the perforation would be stopped short of engagement and a certain amount of time, which would be in proportion to the shrinkage, would be needed to feed the film downward until engagement with the locating pin could occur. By driving the sprocket ahead of its normal position in accordance with the shrinkage, the present invention always positions the perforation in a position to engage the registering pin at the end of the pull-down stroke.

The primary object of the invention, therefore, is to provide in a photographic apparatus a mechanism associated with the film sprocket for moving the film strip toward the film gate which will advance or retard movement of the sprocket in accordance with the amount of shrinkage or stretch in the film strip whereby registration of each image area at the film gate is properly accomplished.

Another object of the invention is to provide in a photographic apparatus a drive mechanism including a differential gear train for coupling and imparting rotation to a pair of spaced film engaging members and for varying, in accordance with the length of film between said members, the relation of the driving point of one of said members to the holding point of said other member.

Still another object of the invention is to provide in a photographic apparatus a drive mechanism including a planetary gear train for coupling and imparting rotation to a pair of spaced film engaging members and for varying, in accordance with the length of film between said members, the relation of the driving point of said one member with respect to the holding point of said other member in the same ratio as the lengths of film between the registering means at the film gate and the holding and driving points of said members.

Yet another object of the invention is to provide in a photographic apparatus a pair of spaced film engaging members, one of said members being a driving member and the other a holding member, arranged ahead of the film gate and having driving and holding points, respectively, which are spaced at substantially the same distance from each other as the driving point is from the registering means at the film gate, said members being coupled together and rotated through a planetary gear train which, in accordance with the length of film between said members, varies the relation of the driving point of said one member with respect to the holding point of said other member to maintain said driving point substantially equidistant from said registering means and said holding point.

A further object of the invention is to provide in a photographic apparatus a mechanism associated with the film sprocket for moving the film intermittently toward the film gate which will advance or retard movement of the sprocket in accordance with the amount of shrinkage or stretch in the film strip whereby registration of each image area at the film gate is properly accomplished and which automatically clamps the film strip during that portion of the cycle in which it is stationary.

And yet another object of the invention is to provide in a photographic apparatus a pair of spaced film engaging members, one of said members being a driving member and the other a holding member arranged ahead of the film gate and having driving and holding points, respectively, which are spaced at substantially the same distance from each other as the driving point is spaced from the registering means at the film gate, said members being coupled together and intermittently rotated by a Geneva mechanism including a planetary gear train which, in accordance with the length of film between said members, varies the relation of the driving point with respect to the holding point so it is substantially equidistant from said registering means and the holding point, the film strip and intermittently driven members of the drive being clamped during the interval the film is stationary at the film gate.

These and other objects and advantages will be apparent to those skilled in the art by the description which follows.

Reference is now made to the accompanying drawings wherein like reference numerals designate like parts and wherein:

Fig. 1 is a diagrammatic side elevation of a motion picture projector showing the relative positions of the film gate, film locating pins, air chambers and rotary valves together with the drive means for continuously moving the film strip toward the film gate;

Fig. 2 is a perspective view, partly in section, showing the drive means for coupling the sprockets and for varying the relation of the driving and holding points of the sprockets in accordance with the length of film therebetween;

Fig. 3 is a diagrammatic detail view of a film strip showing the relation of the registering pin to the driving and holding points of the sprockets;

Fig. 4 is a perspective view, partly in section, showing another embodiment of the invention in which the film is moved intermittently and the film strip and sprockets are automatically clamped during the interval the film is stationary;

Fig. 5 is a detail end view of the brake member on the holding sprocket shaft;

Fig. 6 is a detail end view of the shoe for clamping the film on the holding sprocket;

Fig. 7 is a vertical section through a resilient clamping device adapted to be arranged between the sprockets; and Fig. 8 is a vertical section taken substantially on line 8—8 of Fig. 7.

The present invention is shown in Fig. 1 as adapted to a projector for motion picture film which is used in conjunction with a television transmitting and/or receiving device and which utilizes air under pressure applied to the film loops for registering and advancing the film strip, the diagrammatic representation being that of the preferred embodiment shown and described in my above-mentioned U. S. patent application. As described in said application, the film strip F is moved toward film gate 10, which is provided with an aperture 11, by sprocket 12 to form a loop between sprocket 12 and gate 10. The film strip between sprocket 12 and gate 10 is maintained in a loop by air under pressure which is admitted to chamber 13 by rotary valve 14.

The means for registering each image area on the film strip with aperture 11 comprises pin 15 which is arranged adjacent aperture 11 and has a fixed surface against which an edge of the film perforation is held by the air applied against the upper loop. While only one pin may be used, it has been found that two spaced pins definitely insure proper registration of the image areas adjacent a splice in the film strip. A second chamber 16 is located below the film gate and is enclosed by the film strip being moved therethrough. Rotary valve 17 admits air under pressure to chamber 16 in timed relation to that of valve 14. Sprocket 18 which is continuously rotated moves the film strip from the lower loop to the take-up reel.

If it is assumed the film strip has just been advanced, at such instant the film strip will be taut between pin 15 and sprocket 12 in chamber 13 and formed in a loop between gate 10 and sprocket 18 in chamber 16. Valve 14 then admits air under pressure to chamber 13 and as sprocket 12 moves film toward gate 10, the air pressure maintains said film in a loop and, at the same time, maintains the edges of the film perforations against the surface of pin 15 for holding the film strip in registration at aperture 11. At this time, the air pressure in chamber 16 is cut off by valve 17 and sprocket 18 is moving the film strip from chamber 16 toward the take-up reel, thereby reducing the lower loop. When the air pressure in chamber 13 is cut off by valve 14, valve 17 then admits air to chamber 16 and the air under pressure introduced into chamber 16 causes the lower film loop to expand, thereby moving the film off pin 15 and advancing it until the next perforation is opposite pin 15 at which time the film will again be taut between sprocket 12 and pin 15. The film strip is, therefore, advanced and registered by air pressure applied alternately and in timed relation to the film loops on each side of the film gate. While the foregoing description relates to one of the embodiments disclosed in my copending application for advancing and registering a film strip, the present invention about to be described is applicable to any type of photographic or other apparatus in which a strip material which is subject to shrinkage or stretch must be accurately measured or registered at a point intermediate two fixed stations.

From the foregoing description, it can be readily appreciated that any shrinkage or stretch in the film strip will seriously disrupt registration of each image area at film gate 10. In order to eliminate the error in registration which is due to shrinkage or stretch, a drive means has been devised which will automatically compensate sprocket 12 for any changes in the length of the film strip. This is accomplished by providing an auxiliary sprocket 20 on shaft 21 which is positioned between sprocket 12 and the supply reel, not shown. A drive means is also provided which couples and imparts rotation to both sprockets for moving the film strip toward gate 10. Sprockets 12 and 20 are arranged so that the distance from pin 15 to the driving point of sprocket 12 is substantially equal to the distance between the driving point of sprocket 12 and the holding point of sprocket 20.

The driving point of sprocket 12 is defined as the region in which the forward or working surface of a sprocket tooth is in engagement with the leading edge of a film perforation to move the film strip. The holding point of sprocket 20 is defined as the region in which the rear surface of a sprocket tooth corresponding to that of sprocket 12 is in engagement with the trailing edge of a film perforation to maintain the film taut between the sprockets. In the event rollers are used in place of sprockets, the driving and holding points would then be the region through which the rollers engage the film strip to move it toward the gate. With reference to Fig. 3 it will be noted $p$ designates the pitch of the film perforation. In the case of 16 mm. film an image area or frame is located between adjacent perforations so that $n$ will then designate the number of image areas between pin 15 and a tooth 12$d$ on sprocket 12 and between tooth 12$d$ and a corresponding tooth 20$h$ on sprocket 20, and $pn$ will designate the pitch of the film perforations times the number of perforations. Although pin 15 and tooth 12$d$ engage the leading edge of the perforations, the forces acting on the film strip are in opposed directions, that is, the force of the air pressure on the film loop tends to maintain the leading edge of the perforation against pin 15 and the trailing edge of the perforation against tooth 20$h$. The force exerted on tooth 12$d$ to drive the film into the loop is also against the leading edge of the perforation to overcome the friction applied to sprocket 20 as described hereinafter. Since the working surface of tooth 12$d$ engages the leading edge of the film performation to drive the film toward gate 10 and the rear surface of tooth 20$h$ engages the trailing edge of the perforation to maintain the film between said teeth taut, the forces exerted on the film strip by the teeth of the sprockets are also opposed.

In the assembly of the device, it is necessary to assemble the sprockets with corresponding teeth on each sprocket engaging the perforations as just described. Inasmuch as the sprocket teeth do not contact or engage both edges of the perforations, the front surface of tooth 20$h$ will be spaced a distance $pn + C$ from the front surface of tooth 12$d$, C being the clearance or difference between the width of the sprocket tooth and width of the perforation. If the number of image areas between pin 15 and tooth 12$d$ is the same as those between tooth 12$d$ and tooth 20$h$, the actual difference in dimension will be only clearance C, provided the film is free of any shrinkage or stretch so that for all practical purpose the distances are substantially equal. As a result each perforation is positioned opposite pin 15 and aligned therewith so that any variation in the length of the film between corresponding teeth of the sprockets will result in improper positioning of any perforation with respect to pin 15.

The error in positioning each film perforation with respect to pin 15 is minimized or eliminated by providing a drive means which comprises worm wheel 25 which is integral with sleeve 26 and freely rotatable therewith by means of bearings 27 on shaft 28 to which sprocket 12 is secured, a gear 29 fixed to shaft 28 by pin 30, and a pair of gears 31 and 32 which are also freely rotatable on shaft 28 by reason of bearings 33. The drive means also includes a worm 34 on shaft 35 which is driven by a motor, not shown, a pair of pinions 36 and 37 secured to stub shaft 38 which is journaled in bearing sleeve 39 formed integral with sleeve 26 and rotatable therewith, an idler gear 40 on shaft 41, and a gear 42 secured to shaft 21 to which sprocket 20 is also secured.

Sprocket 12 is the compensatory sprocket whose rotation is to be changed. Auxiliary or holding sprocket 20 is coupled to sprocket 12 through the gear train comprising gears 42, 40 and 32, the differential or planetary gear train 31, 37, 36 and 29 and bearing sleeve 39. Consequently, as the motor drives worm 34, worm wheel 25 and sleeve 26 are rotated, the bearing sleeve 39 being rotated with sleeve 26 and carrying pinions 36 and 37 therewith. As the pinions are carried about shaft 28, pinion 36 which meshes with gear 29 fixed to shaft 28 causes gear 29 and, hence, shaft 28 and sprocket 12 to be rotated. In a like manner, pinion 37 meshes with gear 31 to rotate it and gear 32 on bearings 33 and through idler gear 40, which meshes with gears 32 and 42, rotates gear 42 and, hence, shaft 21 and sprocket 20. If bearing sleeve 39 is regarded as being stationary and gear 42 is rotated in the forward direction through some angle, idler 40 will be rotated and cause gear 32 to also be rotated in the forward direction carrying with it gear 31 which imparts rotation to gears 36 and 37 so that finally gear 29, shaft 28 and sprocket 12 are also rotated together in a forward direction. It is evident that the action of the differential shortens the distance between the driving and holding points of the sprockets because of the gear ratio in the differential and, conversely, if gear 42 is rotated in the opposite direction, the distance will be increased. This action is independent of the rotation of the system as a whole since the drive is through the bearing sleeve 39 or sleeve 26 of the differential. Since the driving point of sprocket 12 is positioned substantially equidistant from pin 15 and the holding point of sprocket 20, the movement of sprocket 12 with respect to sprocket 20 must be in the same ratio as the lengths of film between pin 15 and the driving and holding points of the sprockets. Accordingly, since the film lengths are substantially equal, the overall ratio of the differential must be 2:1 so that sprocket 12 is rotated through only one-half the angle of sprocket 20. Therefore, if sprocket 12 is positioned at any other point along the film strip between pin 15 and sprocket 20, the differential ratio will of necessity have to be changed and will be in the same ratio as the ratio of the film lengths.

If sprockets 12 and 20 are coupled by some other means in addition to the differential gearing, such as film F, the sprockets are free to assume any phase relation made necessary by such coupling. Thus, the driving and holding points of the sprockets may be positioned to properly engage their respective perforations irrespective of any shrinkage or stretch in the film and the driving point of sprocket 12 will be advanced, relative to its normal position, a distance equivalent to the shrinkage in the film between the driving and holding points of the sprockets with the result that a speed of pull-down equivalent to the retrace time of a television scanning system can be attained.

When the mechanism is driven in the forward direction a resisting torque applied to either of the sprockets will produce a torque in the other, thereby tending to create a tension in the film between the sprockets so that sprocket 12 must be the driving sprocket and sprocket 20 must be a hold-back sprocket. If sprocket 12 were thus used to pull film F from the supply reel, the tension of the film between sprockets 12 and 20 would be approximately fifty per cent greater than the tension due to the pull of the supply reel and would vary as the pulls and jerks of the supply reel change the torque applied to the sprocket by the film. To overcome this condition and to isolate the mechanism from such disturbances, an additional sprocket 45 is positioned between sprocket 20 and the supply reel, sprocket 45 feeding the film into a loop L from which the film is fed toward the gate by sprockets 12 and 20. Loop L can be put under tension by applying an air stream or air under pressure to said loop to supply the necessary resisting torque.

A uniform and controlled tension in the film between sprockets 12 and 20 is also required in order to maintain the perforation edges in contact with the forward or working faces of the sprocket teeth. Such a retard or tension means comprises a friction pad 46 on a resilient arm 47 which is biased toward gear 42 so that pad 46 engages the face of said gear. Since the sprockets are coupled by the gear and differential mechanism, the necessary friction could be applied as well to gear 32 or gear 40. Other forms of mechanical resistance could also be used, such as viscous resistance, eddy current damping, etc. In any case, the tension developed in the film must be sufficient to overcome the natural tendency of the film to spring out of a straight path between sprockets 12 and 20 and to withstand the jerk of the pull-down stroke so that the film is not pulled away from the teeth of sprocket 12. To assist in maintaining the film strip in engagement with the sprockets and against the face of film gate 10, hold-down rollers 48, 49, 50 are utilized, as is well-known in the art.

In Fig. 4 another embodiment of the invention is disclosed in which the film strip is advanced intermittently and sprockets 12 and 20 are arranged so that the film strip is moved under sprocket 20 and over sprocket 12. Shaft 100 is driven by a motor not shown and through helical gears 101 and 102 drives shaft 103 continuously. Shaft 103 is journaled in bearing 104 and has fixed thereto a cam 105 and a collar 106 which carries drive pin 107 for star wheel 108 of the Geneva mechanism. Star wheel 108 is freely rotatable on shaft 21 and carries a stud 109 on which the integral pinions 36 and 37 are journaled and are freely rotatable. Pinion 36 meshes with gear 29 fixed to shaft 21, and pinion 37 meshes with gear 31 which is integral with gear 32, gears 31 and 32 being freely rotatable on shaft 21. Shaft 28 and sprocket 12 are rotated by gear 110 which is fixed to shaft 28 and meshes with gear 32.

As described with respect to the first embodiment, the intermittent rotation of star wheel 108 by pin 107, which is accomplished in a well-known manner, is transmitted through pinion 36 and gear 29 to shaft 21 and through pinion 37, gears 31 and 32 and gear 110 to shaft 28, sprockets 12 and 20 being rotated in opposite directions because of the relation of the sprockets to the film strip. Any shrinkage or stretch of the film will, therefore, alter the driving point of sprocket 12 with respect to the holding point of sprocket 20. This action is independent of the rotation of the system as a whole, since the drive is through star wheel 108 and the differential.

During the interval that pin 107 is driving wheel 108 and shafts 21 and 28 through the differential, brake member 111 is acting as a drag on shaft 21. Brake member 111, see Figs. 4 and 5, comprises a cylindrical drum 112 which is secured to shaft 21 and a brake band 113 having an extension 114 which is anchored to bearing 104 by pin 115 so that band 113 cannot rotate with shaft 21 and a forward extension 116 which is intermittently engaged by cam 105 to clamp shaft 21 against rotation during the idle period of wheel 108. The fixed pin 115 may be replaced by an adjustable stop (not shown) to provide an easy control of the frictional resistance caused by the brake band. The use of an intermittent drive and clamp, as described above, insures that while a desirable amount of frictional resistance is present during the rotation of the sprockets to produce the necessary tension in the film between them, yet when the pull-down stroke occurs, the system is rigidly clamped, so that the pull of the film cannot rotate the sprockets and spoil the registration of the perforations at locating pin 15.

In Fig. 4 is shown a supplementary film clamping device to be used when the forces acting on the film are not only strong enough to disturb the operation of the differential drive but are too great for the strength of the perforations engaging teeth of the sprockets 12 and 20. Such a clamping device comprises a shoe 120 which is pivotally mounted on stud 121 and retained between plates 122 which are pivotally mounted on shaft 103 or a suitable stub shaft connected to shaft 103 by means of a suitable gear train. Shoe 120 extends a short way around sprocket 20 in the direction of rotation and terminates in a suitably curved portion which cooperates with cam 123 fixed on shaft 103. That part of the shoe which wraps the sprocket is curved in such a way that when the operation of cam 123 brings shoe 120 closer to the sprocket, the pressure feet 124 nearest the axis of stud 121 are first brought into contact with the film on the sprocket and then are followed by additional pairs of feet in the order of their distance from said axis, see Fig. 6. A sufficient number of pressure feet is used to provide the desired holding power. The working surfaces of feet 124 are suitably relieved to avoid scratching the film in the image or sound track areas and to provide clearance for the passage of the sprocket teeth. Also, feet 124 are positioned to work in the spaces between sprocket teeth with the gaps centered on the teeth and are of suitable width to insure that the feet will not clamp on a film splice, as shown in Fig. 6.

Plates 122 and shoe 120 are retained in an operative position with respect to sprocket 20 by the detent 125. When detent 125 is withdrawn from the aperture in wall 126, the unit may be swung down about shaft 103 against a stop not shown to provide clearance for threading the film. An undercut roller 127 is freely rotatable on stud 121 and when in the operative position, prevents the film from engaging plates 122 or any other part of the sprocket clamping assembly. It is understood that suitable hold-down rollers and a pull-off sprocket are also utilized as shown in Fig. 1 and described with respect to the first-mentioned embodiment.

As alternative arrangements for clamping and/or guiding the film strip, a resiliently mounted member 130 is movably mounted with respect to wall 131, as shown in Figs. 7 and 8, and with the movable member 132 provides a guideway for the film strip between sprockets 12 and 20. As shown in Fig. 8, members 130 and 132 are suitably undercut in a manner and for purposes well-known in the art. Member 132 is moved against member 130 by cam 133 which is secured to shaft 134. A suitable gear drive, not shown, connects shaft 134 with shaft 103. Leaf spring 135 is made sufficiently strong to insure proper clamping of the film strip and at the same time must permit splices to be moved between said members. Such a structure will serve to edge guide the film strip during movement thereof, to clamp the film strip when it is stationary, and to dampen any waves set up in the film strip by the extreme speed of the pull-down. Such a structure in which member 132 is fixed and member 130 is resiliently mounted as shown may be used in conjunction with the sprocket film clamping device for guiding and damping the film strip, the spring 135 then being made very light since its sole purpose will be to maintain the film in position and to accommodate for any splices.

With the mechanism described hereinbefore, the sprocket 12 is automatically driven ahead of its normal position in accordance with the amount of shrinkage, or may lag behind its normal position if the film is stretched, so that the perforation at the film gate will always be in position to engage the locating pin at the end of the pull-down stroke. While the present mechanism is described with reference to a motion picture projector, it is applicable to many other types of apparatus in which a strip material is subject to shrinkage or stretch. The driving sprockets 12 and 20 can be rollers which frictionally drive the strip material and the differential mechanism may take many different forms. Also, the film strip may be advanced and registered by other means than those disclosed and described above. Since many other modifications of the invention will be suggested to those skilled in the art, the scope of the present invention is not to be limited in any respect by the present disclosure but is defined in the appended claims.

Having now particularly described my invention, what I desire to secure by Letters Patent of the United States and what I claim is:

1. In photographic apparatus having a film gate provided with an aperture, the combination with a film advancing means for moving a film strip past said aperture, of film driving members arranged ahead of said film gate and including a compensatory driving member having a driving point and an auxiliary driving member having a hold-back point and for moving said film strip toward said film gate, the compensatory driving member being arranged between said film gate and said auxiliary driving member, and drive means including a differential gear train for operatively coupling and imparting rotation to said film driving members and for varying, in accordance with the length of film between said film driving members, the relation of the driving point of said compensatory driving member with respect to the hold-back point of said auxiliary driving member.

2. In photographic apparatus having a film gate provided with an aperture, the combination with a film advancing means for moving a film strip past said aperture, and registering means arranged adjacent said aperture for positioning each image area with respect to said aperture, of film driving members arranged ahead of said film gate and including a compensatory driving sprocket having a driving point and an auxiliary driving sprocket having a hold-back point and for moving said film strip toward said film gate, the compensatory driving sprocket being arranged between said registering means and said auxiliary driving sprocket, and drive means including a planetary gear train for operatively coupling and imparting rotation to said film driving members and for varying, in accordance with the length of film between said film driving members, the relation of the driving point of said compensatory driving sprocket with respect to the hold-back point of said auxiliary driving sprocket in the same ratio as the lengths of film between said registering means and said driving point and said hold-back point.

3. In photographic apparatus having a film gate provided with an aperture, the combination with a film advancing means for moving a film strip past said aperture, and registering means arranged adjacent said aperture for positioning each image area with respect to said aperture, of film driving members arranged ahead of said film gate and including a compensatory driving sprocket having a driving point and an auxiliary driving sprocket having a hold-back point and for moving said film strip toward said film gate, the compensatory driving sprocket being arranged between said registering means and said auxiliary driving sprocket, drive means including a planetary gear train for operatively coupling and imparting rotation to said film driving members and for varying, in accordance with the length of film between the driving point and hold-back point of said sprockets, the relation of the driving point of said compensatory driving sprocket with respect to the hold-back point of said auxiliary driving sprocket in the same ratio as the lengths of film between said registering means and the driving point and hold-back point of said sprockets, and retard means associated with said drive means for maintaining the film strip between said sprockets under tension.

4. In photographic apparatus having a film gate provided with an aperture, the combination with a film advancing means for moving a film strip past said film gate, of film driving members arranged ahead of said film gate and including a compensatory driving member and an auxiliary driving member both for moving said film strip toward said film gate, the compensatory driving member being arranged between said auxiliary driving member and said film gate and having a driving point substantially equidistant from the upper edge of said aperture and a hold-back point of said auxiliary driving member, and drive means including a differential gear train for operatively coupling and imparting rotation to said driving members and for varying, in accordance with the length of film between said film driving members, the relation of the driving point and the hold-back point of said film driving members to maintain the driving point of said compensatory driving member substantially equidistant from said edge of said aperture and the hold-back point of said auxiliary driving member.

5. In photographic apparatus having a film gate provided with an aperture, the combination with a film advancing means for moving a film strip past said film gate, and registering means arranged adjacent said aperture for positioning each image area with respect to said aperture, of a pair of film driving members arranged ahead of said film gate and including a compensatory driving sprocket and an auxiliary driving sprocket both for moving said film strip toward said film gate, the compensatory sprocket being arranged between said auxiliary sprocket and said film gate and having a driving point substantially equidistant from said registering means and a hold-back point of said auxiliary sprocket, and drive means including a planetary gear train for operatively coupling and imparting rotation to said sprockets and for varying, in accordance with the length of film between said sprockets, the angular relation of said driving point to maintain the driving point of said compensatory sprocket substantially equidistant from said registering means and the hold-back point of said auxiliary sprocket.

6. In photographic apparatus having a film gate provided with an aperture, the combination with a film advancing means for moving a film strip past said film gate, and registering means arranged adjacent said aperture for positioning each image area with respect to said aperture, of a pair of film driving members arranged ahead of said film gate and including a compensatory driving sprocket and an auxiliary driving sprocket both for moving said film strip toward said film gate, the compensatory sprocket being arranged between said auxiliary sprocket and said film gate and having a driving point substantially equidistant from said registering means and a hold-back point of said auxiliary sprocket, drive means including a planetary gear train for operatively coupling and imparting rotation to said sprockets and for varying, in accordance with the length of film between said sprockets, the angular relation of said driving and hold-back points to maintain the driving point of said compensatory sprocket substantially equidistant from said registering means and the hold-back point of said auxiliary sprocket, and retard means associated with said drive means and said auxiliary drive sprocket for maintaining the film strip between said sprockets under tension.

7. In photographic apparatus having a film gate provided with an aperture, the combination with a film advancing means for moving a film strip past said film gate, and registering means arranged adjacent said aperture for positioning each image area with respect to said aperture, of a pair of film driving members arranged ahead of said film gate and including a compensatory driving sprocket and an auxiliary driving sprocket both for moving said film strip toward said film gate, the compensatory sprocket being arranged between said auxiliary sprocket and said film gate and having a driving point substantially equidistant from said registering means and a hold-back point of said auxiliary sprocket, and drive means including a planetary gear train for operatively coupling and imparting rotation to said sprockets and for varying, in accordance with the length of film between said sprockets, the angular relation of the driving point and hold-back point of said sprockets, the driving point of said compensatory sprocket being moved through substantially one-half the angular movement of the hold-back point of said auxiliary sprocket to maintain the driving point of said compensatory sprocket substantially equidistant from said registering means and the hold-back point of said auxiliary sprocket.

8. In photographic apparatus having a film gate provided with an aperture, the combination with a film advancing means for moving a film strip past said aperture, and registering means arranged adjacent said aperture for positioning each image area with respect to said aperture, of film driving members arranged ahead of said film gate and including a drive shaft, a compensatory driving member secured to said drive shaft and having a driving point, an auxiliary drive shaft and an auxiliary driving member secured to said auxiliary drive shaft and having a hold-back point, both film driving members being adapted to move said film strip toward said film gate and with the compensatory driving member being arranged between said auxiliary driving member and said film gate, a drive means including a worm wheel and a pair of coaxially aligned gears freely rotatable on said drive shaft, a gear secured to said drive shaft, a second gear secured to said auxiliary drive shaft, an idler gear operatively connecting said second gear and one of said pair of gears, and a pair of coaxially aligned pinions carried by said worm wheel for movement around said drive shaft, one of said pinions meshing with said gear and the other of said pinions meshing with the other of said pair of gears for operatively coupling and imparting rotation to said film driving members and for varying, in accordance with the length of film between the driving point and hold-back point of said film driving members, the relation of the driving point of said compensatory driving member with respect to the hold-back point of said auxiliary driving member in the same ratio as the lengths of film between said registering means and the driving point and the holding point of said film driving members.

9. In photographic apparatus having a film gate provided with an aperture, the combination with a film advancing means for moving a film strip past said aperture, and registering means arranged adjacent said aperture for positioning each image area with respect to said aperture, of film driving members arranged ahead of said film gate and including a drive shaft, a compensatory sprocket secured to said drive shaft, an auxiliary drive shaft and an auxiliary sprocket secured to said auxiliary drive shaft, both sprockets being adapted to move said film strip toward said film gate and with said compensatory sprocket being arranged between said auxiliary sprocket and said film gate and having a driving point substantially equidistant from said registering means and a hold-back point of said auxiliary sprocket, a drive means including a worm wheel and a pair of coaxially aligned gears freely rotatable on said drive shaft, a gear secured to said drive shaft, a second gear secured to said auxiliary drive shaft, an idler gear operatively connecting said second gear and one of said pair of gears and a pair of coaxially aligned pinions carried by said worm wheel for movement around said drive shaft, one of said pinions meshing with said gear and the other of said pinions meshing with the other of said pair of gears for operatively coupling and imparting rotation to said sprockets and for varying, in accordance with the length of film between the driving and hold-back points of said sprockets, the relation of the driving and hold-back points of said sprockets to maintain the driving point of said compensatory sprocket substantially equidistant from said registering means and the hold-back point of said auxiliary sprocket.

10. In photographic apparatus having a film gate provided with an aperture, the combination with a film advancing means for moving a film strip past said aperture, and registering means arranged adjacent said aperture for positioning each image area with respect to said aperture, of film driving members arranged ahead of said film gate and including a drive shaft, a compensatory sprocket secured to said drive shaft, an auxiliary drive shaft and an auxiliary sprocket secured to said auxiliary drive shaft, both sprockets being adapted to move said film strip toward said film gate and with said compensatory sprocket being arranged between said auxiliary sprocket and said film gate and having a driving point substantially equidistant from said registering means and a hold-back point of said auxiliary sprocket, a drive means including a worm wheel and a pair of coaxially aligned gears freely rotatable on said drive shaft, a gear secured to said drive shaft, a second gear secured to said auxiliary drive shaft, an idler gear operatively connecting said second gear and one of said pair of gears, and a pair of coaxially aligned pinions carried by said worm wheel for movement around said drive shaft, one of said pinions meshing with said gear and the other of said pinions meshing with the other of said pair of gears for operatively coupling and imparting rotation to said sprockets and for varying, in accordance with the length of film between the driving and hold-back points of said sprockets, the relation of the driving and hold-back points of said sprockets to maintain the driving point of said compensatory sprocket substantially equidistant from said registering means and the hold-back point of said auxiliary sprocket, and retard means frictionally engaging said second gear for maintaining the film strip between said sprockets under tension.

11. In photographic apparatus having a film gate provided with an aperture, the combination with a film advancing means for moving a film strip past said aperture, of film driving members arranged ahead of said film gate and including a compensatory driving member having a driving point and an auxiliary driving member having a hold-back point and for moving said film strip toward said film gate, the compensatory driving member being arranged between said film gate and said auxiliary driving member, and drive means including an intermittently driven member and a differential gear train movable thereby for operatively coupling and imparting intermittent rotation to said film driving members and for varying, in accordance with the length of film between said film driving members, the relation of the driving point of said compensatory driving member with respect to the hold-back point of said auxiliary driving member.

12. In photographic apparatus having a film gate provided with an aperture, the combination with a film advancing means for moving a film strip past said aperture, of film driving members arranged ahead of said film gate and including a compensatory driving member having a driving point and an auxiliary driving member having a hold-back point and for moving said film strip toward said film gate, the compensatory driving member being arranged between said film gate and said auxiliary driving member, and drive means including an intermittently driven member and a differential gear train movable thereby for operatively coupling and imparting intermittent rotation to said film driving members and for varying, in accordance with the length of film between said film driving members, the relation of the driving point of said compensatory driving member with respect to the hold-back point of said auxiliary driving member, and means responsive to said drive means for preventing movement of said film during the interval the film strip is stationary.

13. In photographic apparatus having a film gate provided with an aperture, the combination with a film advancing means for moving a film strip past said film gate, of film driving members arranged ahead of said film gate and including a compensatory driving member and an auxiliary driving member both for moving said film strip toward said film gate, the compensatory driving member being arranged between said auxiliary driving member and said film gate and having a driving point substantially equidistant from the upper edge of said aperture and a hold-back point of said auxiliary driving member, drive means including an intermittently driven member and a differential gear train carried thereby for operatively coupling and imparting rotation to said driving members and for varying, in accordance with the length of film between said film driving members, the relation of the driving point and the hold-back point of said film driving members to maintain the driving point of said compensatory driving member substantially equidistant from said edge of said aperture and the hold-back point of said auxiliary driving member, and braking means normally producing a drag on said auxiliary driving member and operatively connected to said drive means and actuated thereby for preventing rotation of said film driving members during the interval the film strip is stationary.

14. In photographic apparatus having a film gate provided with an aperture, the combination with a film advancing means for moving a film strip past said aperture, and registering means arranged adjacent said aperture for positioning each image area with respect to said aperture, of film driving members arranged ahead of said film gate and including a compensatory driving sprocket and an auxiliary driving sprocket both for moving said film strip toward said film gate, the compensatory sprocket being arranged between said film gate and said auxiliary sprocket and having a driving point substantially equidistant from said registering means and a hold-back point of said auxiliary sprocket, drive means including an intermittently driven member and a differential gear train movable thereby for operatively coupling and imparting intermittent rotation to said sprockets and for varying, in accordance with the length of film between said driving and hold-back points of said sprockets, the angular relation of said driving and hold-back points to maintain the driving point of said compensatory sprocket substantially equidistant from said registering means and the hold-back point of said auxiliary sprocket, and means responsive to said drive means for preventing movement of said film strip and said film driving members during interval the film strip is stationary.

15. In photographic apparatus having a film gate provided with an aperture, the combination with a film advancing means for moving a film strip past said aperture, and registering means arranged adjacent said aperture for positioning each image area with respect to said aperture, of film driving members arranged ahead of said film gate and including a compensatory driving sprocket and an auxiliary driving sprocket both for moving said film strip toward said film gate, the compensatory sprocket being arranged between said film gate and said auxiliary sprocket and having a driving point substantially equidistant from said registering means and a hold-back point of said auxiliary sprocket, drive means including an intermittently driven member and a differential gear train movable thereby for operatively coupling and imparting intermittent rotation to said sprockets and for varying, in accordance with the length of film between said driving and hold-back points of said sprockets, the angular relation of said driving and hold-back points to maintain the driving point of said compensatory sprocket substantially equidistant from said registering means and the hold-back point of said auxiliary sprocket, braking means normally producing a drag on said film driving members and operatively connected to said drive means and actuated thereby for preventing rotation of said film drive members during the interval the film strip is stationary, and means arranged adjacent said film driving members and responsive to said drive means for clamping said film strip against movement during the interval the film strip is stationary.

RAYMOND W. WENGEL.

References Cited in the file of this patent

UNITED STATES PATENTS

| Number | Name | Date |
|---|---|---|
| 1,309,471 | Evans | July 8, 1919 |
| 2,560,918 | Bedford et al. | July 17, 1951 |
| 2,560,919 | Bedford | July 17, 1951 |
| 2,601,347 | Waller | June 24, 1952 |
| 2,601,790 | Magnusson | July 1, 1952 |